United States Patent
Isson

(10) Patent No.: US 10,631,264 B2
(45) Date of Patent: Apr. 21, 2020

(54) METHOD AND ACCESS NETWORK FOR ESTIMATING THE MOVEMENT OF A TERMINAL OF INTEREST WITH RESPECT TO SAID ACCESS NETWORK

(71) Applicant: SIGFOX, Labege (FR)

(72) Inventor: Olivier Isson, Saint-Orens de Gameville (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 16/327,296

(22) PCT Filed: Aug. 28, 2017

(86) PCT No.: PCT/EP2017/071517
§ 371 (c)(1),
(2) Date: Feb. 21, 2019

(87) PCT Pub. No.: WO2018/041766
PCT Pub. Date: Mar. 8, 2018

(65) Prior Publication Data
US 2019/0208496 A1    Jul. 4, 2019

(30) Foreign Application Priority Data

Aug. 30, 2016 (FR) ...................................... 16 58018

(51) Int. Cl.
| | |
|---|---|
| *H04W 64/00* | (2009.01) |
| *G01S 5/02* | (2010.01) |
| *G01S 5/06* | (2006.01) |
| *G01S 11/10* | (2006.01) |
| *H04W 4/02* | (2018.01) |
| *H04W 24/10* | (2009.01) |

(52) U.S. Cl.
CPC .......... *H04W 64/006* (2013.01); *G01S 5/021* (2013.01); *G01S 5/06* (2013.01); *G01S 11/10* (2013.01); *H04W 4/023* (2013.01); *H04W 24/10* (2013.01)

(58) Field of Classification Search
CPC ... H04W 64/006; H04W 4/023; H04W 24/10; G01S 5/021; G01S 5/06; G01S 11/10
USPC ................................... 455/456.1–456.6, 457
See application file for complete search history.

(56) References Cited

U.S. PATENT DOCUMENTS

| | | | |
|---|---|---|---|
| 8,878,725 B2* | 11/2014 | Lu ............................. | G01S 1/04 342/450 |
| 9,658,314 B2* | 5/2017 | Parks ........................ | G01S 5/04 |

(Continued)

*Primary Examiner* — Mong-Thuy T Tran
(74) *Attorney, Agent, or Firm* — Im IP Law; Chai Im; C. Andrew Im

(57) ABSTRACT

A method for estimating the movement of a terminal of interest with respect to an access network. An incoming frequency of a message of interest transmitted by the terminal of interest and received by a pair of base stations of the access network are measured. The incoming frequencies of calibration messages transmitted by calibration terminals and received by the pair of base stations are measured. A differential measurement error according to the incoming frequencies of the calibration messages is estimated. A difference in incoming frequency of the message of interest according to the incoming frequencies of the message of interest and according to the differential measurement error is estimated. The movement of the terminal of interest according to the difference in incoming frequency of the message of interest is estimated.

8 Claims, 1 Drawing Sheet

(56) References Cited

U.S. PATENT DOCUMENTS

| | | | |
|---|---|---|---|
| 2002/0196186 A1* | 12/2002 | Holt | G01S 5/02 |
| | | | 342/453 |
| 2004/0029558 A1* | 2/2004 | Liu | G01S 5/02 |
| | | | 455/404.2 |
| 2007/0120738 A1 | 5/2007 | Stroud | |
| 2007/0236389 A1 | 10/2007 | Lommen et al. | |
| 2008/0158059 A1* | 7/2008 | Bull | G01S 5/06 |
| | | | 342/387 |
| 2014/0278214 A1 | 9/2014 | Broad et al. | |
| 2016/0353238 A1* | 12/2016 | Gherardi | H04W 4/021 |
| 2017/0003376 A1* | 1/2017 | Wellman | G01S 5/0221 |

* cited by examiner

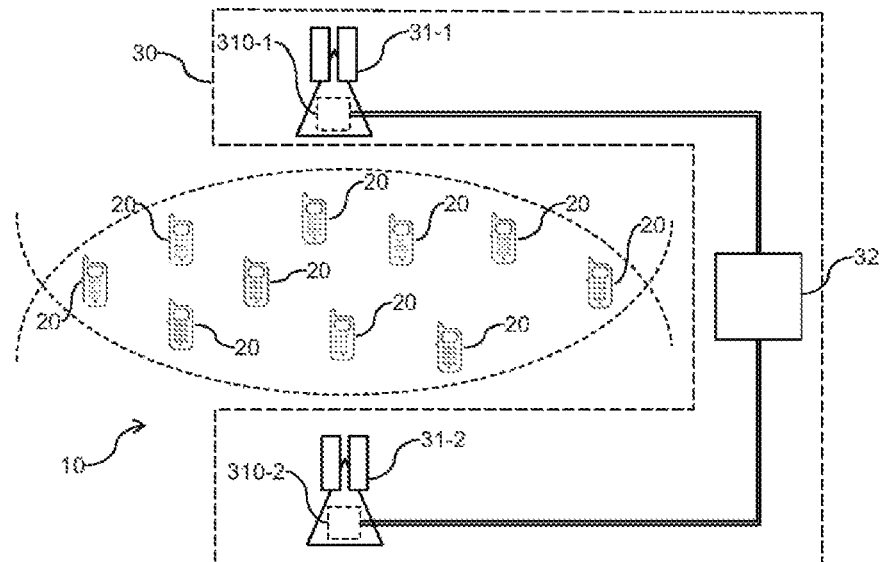
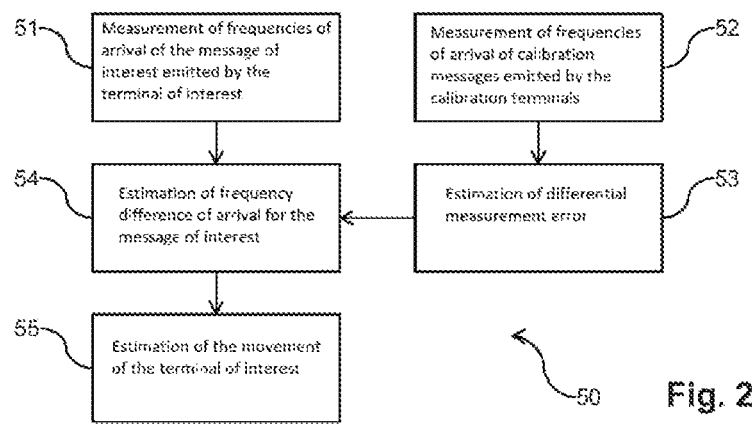
Fig. 2

METHOD AND ACCESS NETWORK FOR ESTIMATING THE MOVEMENT OF A TERMINAL OF INTEREST WITH RESPECT TO SAID ACCESS NETWORK

RELATED APPLICATIONS

This application is a § 371 application of PCT/EP2017/071517 filed Aug. 28, 2017, which claims priority from French Patent Application No. 16 58018 filed Aug. 30, 2016, each of which is incorporated herein by reference in its entirety.

TECHNICAL FIELD

The present invention belongs to the field of digital telecommunications, and relates more particularly to a method for estimation of the movement of a terminal with respect to an access network of a wireless communication system.

BACKGROUND OF THE INVENTION

"Estimation of movement" of the terminal means determining whether said terminal is mobile or immobile and/or determining at least one characteristic of the movement of said terminal (speed, acceleration, etc.).

In the existing wireless communication systems, it is known to estimate the movement of a terminal with respect to an access network on the basis of at least one frequency difference of arrival ("Frequency Difference of Arrival" or FDOA in the Anglo-Saxon literature) of a message emitted by said terminal and received by at least two base stations of said access network.

Indeed, a message is emitted by the terminal on an emission frequency. If the terminal is immobile, then the frequency of arrival of said message to a base station of the access network is theoretically equal to the emission frequency of said message.

However, if the terminal is mobile, then the frequency of arrival of said message to a base station of the access network can differ from the emission frequency of said message via the Doppler effect. Moreover, the frequency of arrival of the message at a base station depends on the movement of the terminal relative to this base station, in such a way that, when the terminal is mobile, the frequency of arrival of the same message can vary from one base station to another.

Thus, if the frequency difference of arrival of said message for two base stations is zero, then the terminal is in principle immobile. In the contrary case (non-zero frequency difference of arrival), the terminal can be considered to be mobile. In a known manner, the movement of the terminal (or even its position) can also be estimated in a more precise manner by considering a plurality of frequency differences of arrival measured for a plurality of different pairs of base stations of the access network.

In order to carry out such a measurement of frequency difference of arrival for a pair of base stations, said base stations must be synchronised in frequency. Indeed, in the absence of frequency synchronisation, the measurement of frequency difference of arrival can be affected by a differential measurement error which is independent of the movement of the terminal, and which is only dependent on the errors in the respective frequency references of said base stations of the pair in question.

However, carrying out such a frequency synchronisation of the base stations to each other increases the complexity and the cost of deployment of the access network of the wireless communication system.

Today, it is envisaged to deploy wireless communication systems optimised for uses of the M2M type (Anglo-Saxon acronym for "Machine-to-Machine") or of the "Internet of things" type ("Internet of Things" or IoT in the Anglo-Saxon literature).

For such uses, in particular, the cost of the deployment of the access network of the wireless communication system must be reduced to the maximum, in such a way that it is not possible to ensure that the base stations can be frequency synchronised to each other.

OBJECT AND SUMMARY OF THE INVENTION

The goal of the present invention is to overcome all or a part of the limitations of the solutions of the prior art, in particular those disclosed above, by proposing a solution that allows to estimate the movement of a terminal on the basis of one or more measurements of frequency difference of arrival, without having to synchronise the base stations of the access network in frequency.

For this purpose, and according to a first aspect, the invention relates to a method for estimation of the movement of a terminal of interest with respect to an access network of a wireless communication system, the terminal of interest being located in a geographical area served by a pair of base stations of said access network. The estimation method comprises:

- a measurement, for each base station of said pair, of a frequency of arrival of a message of interest emitted by the terminal of interest,
- a measurement, for each base station of said pair, of frequencies of arrival of calibration messages emitted by calibration terminals distinct from said terminal of interest,
- an estimation of a differential measurement error for the pair of base stations on the basis of the frequencies of arrival of the calibration messages,
- an estimation of a frequency difference of arrival of the message of interest on the basis of the frequencies of arrival of said message of interest and on the basis of the differential measurement error,
- an estimation of the movement of the terminal of interest on the basis of the frequency difference of arrival of the message of interest for said pair of base stations.

Moreover, the movements of all or a portion of the calibration terminals are not known and the estimation of the differential measurement error comprises a calculation, for each calibration message, of a frequency difference of arrival of said calibration message for said pair of base stations on the basis of the measured frequencies of arrival of said calibration message. The differential measurement error is estimated by a calculation of an average value of the frequency differences of arrival of the calibration messages.

Thus, the method for estimation of the movement of the terminal of interest uses, in order to estimate and compensate for a differential measurement error inherent to the pair of base stations in question, calibration messages emitted by calibration terminals distinct from the terminal of interest, and received by this same pair of base stations. The frequency differences of arrival calculated for the calibration messages are also affected by substantially the same differential measurement error, and thus allow to estimate said differential measurement error.

It should be noted that a calibration terminal is not necessarily a terminal used only to estimate the differential measurement error. On the contrary, a calibration terminal can be any terminal of the wireless communication terminal that is not the terminal of interest, the movement of which is desired to be estimated. Thus, a terminal of the wireless communication system can be, over time, either a terminal of interest, the movement of which is desired to be estimated, or a calibration terminal used to estimate the differential measurement error in order to estimate the movement of another terminal.

In a wireless communication system for uses of the M2M and/or IoT type, the number of terminals served by the access network is potentially very high, which thus allows, at any moment, to have a potentially high number of terminals that can be used as calibration terminals for a terminal of interest.

The frequency difference of arrival measured for a calibration terminal corresponds to the actual frequency difference of arrival of said calibration terminal, to which the differential measurement error is added.

If the calibration terminal is immobile, its actual frequency difference of arrival is theoretically zero, in such a way that the frequency difference of arrival measured corresponds to the differential measurement error.

For mobile calibration terminals, their respective actual frequency differences of arrival are not zero. However, with a significant number of such calibration terminals, moving with independent movements, there are on average as many calibration terminals which are moving closer to one of the base stations of the pair (and which are moving away from the other base station of the pair) as calibration terminals which are moving away from this base station of the pair (and which are moving closer to the other base station of the pair). Consequently, for a large number of calibration terminals, the average value of the actual frequency differences of arrival must in principle tend towards zero, in such a way that the average value of the frequency differences of arrival measured must in principle tend towards the differential measurement error regardless of the movements of the calibration terminals, which do not therefore have to be known a priori.

In specific modes of implementation, the estimation method can further comprise one or more of the following features, taken alone or according to any technically possible combination.

In specific modes of implementation, the calibration messages are selected as being messages received during a time window of a predetermined length comprising the reception of the message of interest.

Indeed, the differential measurement error depends mainly on the errors in the respective frequency references of the base stations, which fluctuate independently of one another over time. Consequently, it is advantageous to consider calibration messages received close in time to the message of interest, in order to ensure that the frequency differences of arrival of said calibration messages are affected by substantially the same differential measurement error as the frequency difference of arrival of the message of interest.

In specific modes of implementation, a portion of the calibration terminals are reference terminals, each reference terminal having a predetermined movement.

Such arrangements allow to improve the precision of the estimation of the differential measurement error, in particular when the number of calibration terminals is not very high.

In specific modes of implementation, the terminal of interest being located in a geographical area served by at least three base stations forming three pairs of base stations, said method comprises the estimation of the frequency difference of arrival of said message of interest for each of said three pairs of base stations, and the movement of the terminal of interest is estimated on the basis of the frequency differences of arrival of the message of interest estimated for the three pairs of base stations.

According to a second aspect, the invention relates to an access network for estimating the movement of a terminal of interest, the terminal of interest being located in a geographical area served by a pair of base stations of said access network. The access network comprises:

means configured to measure, for each base station of the pair, a frequency of arrival of a message of interest emitted by the terminal of interest and frequencies of arrival of calibration messages emitted by calibration terminals distinct from the terminal of interest, means configured to estimate a differential measurement error for the pair of base stations on the basis of the frequencies of arrival of the calibration messages, means configured to estimate a frequency difference of arrival of the message of interest on the basis of the frequencies of arrival of said message of interest and on the basis of the differential measurement error, means configured to estimate the movement of the terminal of interest on the basis of the frequency difference of arrival of the message of interest for said pair of base stations.

Moreover, the movements of all or a portion of the calibration terminals are not known and said access network comprises:

means configured to calculate, for each calibration message, a frequency difference of arrival of said calibration message for said pair of base stations on the basis of the measured frequencies of arrival of said calibration message, means configured to estimate the differential measurement error by a calculation of an average value of the frequency differences of arrival of the calibration messages.

In specific embodiments, the access network can further comprise one or more of the following features, taken alone or according to any technically possible combination.

In specific embodiments, the access network selects the calibration messages as being messages received during a time window of a predetermined length comprising the reception of the message of interest.

According to a third aspect, the invention relates to a wireless communication system comprising a terminal of interest, calibration terminals and an access network according to any one of the embodiments of the invention.

In specific embodiments of the wireless communication system, a portion of the calibration terminals are reference terminals, each reference terminal having a predetermined movement.

PRESENTATION OF THE DRAWINGS

The invention will be better understood upon reading the following description, given as an example that is in no way limiting, and made in reference to the drawings which show:

FIG. 1: a schematic representation of a wireless communication system;

FIG. 2: a diagram illustrating the main steps of a method for estimation of movement of a terminal of the wireless communication system of FIG. 1.

In these drawings, identical references from one figure to another designate identical or analogous elements. For reasons of clarity, the elements shown are not to scale, unless mentioned otherwise.

DETAILED DESCRIPTION OF EMBODIMENTS

FIG. 1 represents schematically a wireless communication system 10 comprising a plurality of terminals 20 and an access network 30 comprising a plurality of base stations.

The terminals 20 and the base stations of the access network 30 exchange messages in the form of radioelectric signals. "Radioelectric signal" means an electromagnetic wave propagating via wireless means, the frequencies of which fall within the conventional spectrum of radioelectric waves (several hertz to several hundred gigahertz).

In particular, each base station of the access network 30 is adapted for receiving messages from any terminal 20 that is located in its coverage area, and comprises for this purpose wireless communication means allowing said base station to receive messages emitted by the terminals 20. The wireless communication means are conventionally in the form of a radioelectric circuit comprising equipment (antenna, amplifier, local oscillator, mixer, analogue filter, etc.) considered to be known to a person of ordinary skill in the art.

In the non-limiting example illustrated by FIG. 1, only two base stations are shown, respectively designated by 31-1 and 31-2, forming a pair of base stations. The terminals 20 shown are located in a geographical area served both by the base station 31-1 and by the base station 31-2. In other words, a message emitted by any one of these terminals 20 is received both by the base station 31-1 and by the base station 31-2.

FIG. 2 shows a diagram of the main steps of a method 50 for estimation of the movement of a terminal 20 of interest with respect to the access network 30. The various steps of the estimation method 50, shown in FIG. 2, are all executed by the access network 30.

As illustrated by FIG. 2, the estimation method 50 comprises steps of:
- 51 measurement, for each base station 31-1, 31-2 of the pair, of a frequency of arrival of a message of interest emitted by the terminal 20 of interest,
- 52 measurement, for each base station 31-1, 31-2 of said pair, of frequencies of arrival of calibration messages emitted by calibration terminals 20 distinct from said terminal of interest 20,
- 53 estimation of a differential measurement error for the pair of base stations 31-1, 31-2 on the basis of the frequencies of arrival of the calibration messages,
- 54 estimation of a frequency difference of arrival of the message of interest on the basis of the frequencies of arrival of said message of interest and on the basis of the differential measurement error.
- 55 estimation of the movement of the terminal 20 of interest on the basis of the frequency difference of arrival of the message of interest for said pair of base stations 31-1, 31-2.

It should be noted that the terminal 20 of interest can be any one of the terminals shown in FIG. 1 located in the geographical area served by the pair of base stations 31-1, 31-2. For a given terminal 20 of interest, each of the other terminals 20 located in said geographical area served by the pair of base stations 31-1, 31-2 can thus be used, in the estimation method 50, as a calibration terminal 20 for estimating the movement of said terminal 20 of interest, even if the movements of said calibration terminals in question are not known a priori to the access network 30.

Examples of implementation of the various steps of the method 50 for estimation of the movement of the terminal 20 of interest are described below.

1) Measurement of Frequency of Arrival

The steps 51 and 52 of measuring frequency of arrival are analogous and differ by the origin of the message, the frequency of arrival of which must be measured for each base station 31-1, 31-2 of the pair. The message of interest is a message emitted by the terminal 20 of interest and the calibration messages are messages emitted by the calibration terminals 20.

It should be noted that the same message can be successively used as a message of interest, when the terminal 20 that emitted it is the terminal of interest, the movement of which is desired to be estimated, or as a calibration message, when the terminal 20 that emitted it is used as a calibration terminal for another terminal.

The steps 51 and 52 of measuring frequency of arrival are preferably implemented by each of the base stations 31-1, 31-2.

Each base station 31-1, 31-2 comprises for example, for this purpose, a measurement circuit 310-1, 310-2. Each measurement circuit 310-1, 310-2 comprises for example one or more processors and memorisation means (magnetic hard disk, electronic memory, optical disk, etc.) in which a computer program product is memorised, in the form of a set of program code instructions to be executed in order to implement the steps 51 and 52 of measuring frequency of arrival. Alternatively or in addition, each measurement circuit 310-1, 310-2 comprises one or more programmable logic circuits (FPGA, PLD, etc.), and/or one or more specialised integrated circuits (ASIC), and/or a set of discrete electronic components, etc., adapted for implementing all or a portion of said steps 51 and 52 of measuring frequency of arrival.

In other words, the measurement circuit 310-1, 310-2 of a base station 31-1, 31-2 comprises a set of means configured by software (specific computer program product) and/or by hardware (FPGA, PLD, ASIC, discrete electronic components, etc.) to implement the steps 51 and 52 of measuring frequency of arrival on the basis of a signal provided by the radioelectric circuit, comprising the message in question.

According to a non-limiting example, the measurement circuit 310-1, 310-2 can calculate a frequency spectrum of the signal provided by the radioelectric circuit, for example via a Fast Fourier transform (FFT) and measure the frequency of arrival of the message in question in the frequency domain.

It should be noted that the steps 51 and 52 of measuring frequency of arrival can also not be implemented by the base stations 31-1, 31-2. In such a case, the access network 30 can comprise one or more measurement circuits, corresponding to that which was described above, which are remote from said base stations 31-1 and 31-2 and which are adapted to exchanging data with the latter, and which receive for example, from the latter, the signals provided by the radioelectric circuits.

After the step 51 of measuring the frequency of arrival of the message of interest, there is therefore a measurement $FI_1$ of the frequency of arrival at the base station 31-1, and a measurement $FI_2$ of the frequency of arrival at the base station 31-2 which can be expressed as follows:

$$FI_k = FI + \delta FI_k + \Delta F_k$$

an expression in which:
- k is equal to 1 for the base station 31-1 or is equal to 2 for the base station 31-2,
- FI corresponds to the frequency of emission of the message of interest by the terminal 20 of interest,
- $\delta FI_k$ corresponds to the frequency shift introduced by the Doppler effect at the base station 31-k, because of the movement of the terminal 20 of interest with respect to the base station 31-k,
- $\Delta F_k$ corresponds to the measurement error introduced by the frequency reference of the base station 31-k.

If it is considered that there are $N_{TC}$ calibration messages, after the step 52 of measuring the frequency of arrival of the calibration message having the index n ($1 \leq n \leq N_{TC}$), a measurement $FC_{n,1}$ of the frequency of arrival at the base station 31-1, and a measurement $FC_{n,2}$ of the frequency of arrival at the base station 31-2 are therefore available and can be expressed as follows:

$$FC_{n,k} = FC_n + \delta FC_{n,k} + \Delta F_k$$

an expression in which:
- $1 \leq n \leq N_{TC}$ and k=1 or 2,
- $FC_n$ corresponds to the frequency of emission of the calibration message having the index n,
- $\delta FC_{n,k}$ corresponds to the frequency shift introduced by the Doppler effect at the base station 31-k, because of the movement of the calibration terminal 20 having emitted the calibration message having the index k with respect to the base station 31-k.

In practice, the measurement error $\Delta F_k$ (k=1 or 2) varies over time, independently from one base station to another. In preferred modes of implementation, the calibration messages are thus selected as being messages received during a time window of a predetermined length comprising the reception of the message of interest. The length of said time window is chosen in such a way as to ensure that the variation of the measurement error $\Delta F_k$ over this length of time is negligible. Thus, it is ensured that all the measurements of frequency of arrival of the calibration messages are affected by substantially the same measurement error as the measurement of frequency of arrival of the message of interest.

2) Estimation of Differential Measurement Error

During the step 53, the frequencies of arrival of the calibration message are used to estimate the differential measurement error for the pair of base stations 31-1, 31-2. The differential measurement error corresponds to the difference between the measurement errors $\Delta F_1$ and $\Delta F_2$ respectively introduced by the base station 31-1 and by the base station 31-2.

The step 53 of estimation of the differential measurement error is for example implemented by a processing server 32 of the access network 30, which receives, from the measurement circuits 310-1, 310-2, the measurements of frequencies of arrival of the calibration messages.

The processing server 32 comprises for example one or more processors and memorisation means (magnetic hard disk, electronic memory, optical disk, etc.) in which a computer program product is memorised, in the form of a set of program code instructions to be executed in order to implement the various steps of the estimation method 50 that must be executed by said processing server 32.

Alternatively or in addition, the processing server 32 comprises one or more programmable logic circuits (FPGA, PLD, etc.), and/or one or more specialised integrated circuits (ASIC), and/or a set of discrete electronic components, etc., adapted for implementing all or a portion of said steps of the estimation method 50.

In other words, the processing server 32 comprises a set of means configured by software (specific computer program product) and/or by hardware (FPGA, PLD, ASIC, discrete electronic components, etc.) to implement the steps of the estimation method 50 executed by said processing server 32.

In the example illustrated by FIG. 1, the access network 30 is shown as comprising a single processing server 32. However, nothing excludes, according to other examples, having a plurality of processing servers 32 in the access network 30. Moreover, in the example illustrated by FIG. 1, the processing server 32 is shown as corresponding to a single piece of equipment. However, nothing excludes, according to other examples, having a processing server 32 distributed over a plurality of remote pieces of equipment.

The step 53 of estimation of the differential measurement error comprises for example the calculation, for each calibration measurement, of a difference between the measurements of the frequencies of arrival of said calibration message in each of the base stations 31-1 and 31-2. The frequency difference of arrival for the calibration message having the index n ($1 \leq n \leq N_{TC}$) is for example calculated according to the following expression:

$$\Delta FC_{n,12} = FC_{n,1} - FC_{n,2} = \delta FC_{n,12} + \Delta F_{12}$$

an expression in which
- $\delta FC_{n,12} = \delta FC_{n,1} - \delta FC_{n,2}$ corresponds to the actual frequency difference of arrival of the calibration message having the index n,
- $\Delta F_{12} = \Delta F_1 - \Delta F_2$ corresponds to the differential measurement error for the pair of base stations 31-1, 31-2.

The differential measurement error is for example estimated by a calculation of the average value of the frequency differences of arrival of the calibration messages, for example according to the following expression:

$$\Delta Fe_{12} = \frac{1}{N_{TC}} \cdot \sum_{n=1}^{N_{TC}} \Delta FC_{n,12} = \Delta F_{12} + \frac{1}{N_{TC}} \cdot \sum_{n=1}^{N_{TC}} \delta FC_{n,12}$$

an expression in which $\Delta Fe_{12}$ corresponds to the estimated value of the differential measurement error $\Delta F_{12}$.

Indeed, if the number $N_{TC}$ of calibration messages is large, which is generally the case for a wireless communication system 10 for M2M and/or IoT uses, the average value of the actual frequency differences of arrival tends towards zero:

$$\lim_{N_{TC} \to \infty} \left( \frac{1}{N_{TC}} \cdot \sum_{n=1}^{N_{TC}} \delta FC_{n,12} \right) = 0$$

It should be noted that other methods for estimation of the differential measurement error, on the basis of the measurements of the frequencies of arrival of the calibration messages, can be implemented, the choice of a particular method merely corresponds to an alternative of implementation of the invention.

In particular, in certain modes of implementation, a portion of the calibration terminals 20 can be reference terminals, that is to say, terminals, the movement of which is predetermined, known a priori to the access network 30. For a reference terminal, the actual frequency difference of arrival $\delta FC_{n,12}$, eventually zero if the reference terminal is immobile, is known a priori, and can consequently be subtracted from the frequency difference of arrival $\Delta FC_{n,12}$ before calculating the average value.

3) Estimation of Frequency Difference of Arrival of the Message of Interest

During the step 54, the frequency difference of arrival of the message of interest for the pair of base stations 31-1, 31-2, designated hereinafter as $FDOA_{12}$, is estimated on the basis of the frequencies of arrival of said message of interest and on the basis of the differential measurement error $\Delta Fe_{12}$ estimated during the step 53.

The step 54 of estimation of frequency difference of arrival of the message of interest is for example also implemented by the processing server 32 described above, for example according to the following expression:

$$FDOA_{12}=FI_1-FI_2-\Delta Fe_{12}$$

4) Estimation of Movement of the Terminal of Interest

During the step 55, the movement of the terminal 20 of interest is estimated on the basis of the frequency difference of arrival $FDOA_{12}$ estimated for the pair of base stations 31-1, 31-2.

As indicated above, the estimation of the movement of the terminal 20 of interest can involve determining whether said terminal 20 of interest is immobile or mobile. For example, if the frequency difference of arrival $FDOA_{12}$ is, in terms of absolute value, less than a predetermined threshold value, the terminal 20 of interest is considered to be immobile. In the contrary case, the terminal 20 of interest is considered to be mobile.

It is also possible, according to other examples of implementation, to estimate, in a more precise manner, one or more characteristics of the movement of the terminal 20 of interest (speed, acceleration, etc.). For example, when the terminal 20 of interest is located in a geographical area served by at least three base stations forming three pairs of base stations, it is possible to estimate a frequency difference of arrival $FDOA_{ij}$ of the message of interest for each of the pairs of base stations 31-$i$, 31-$j$ by executing the steps 51, 52, 53 and 54 described above. The movement of the terminal 20 of interest is then estimated, during the step 55, on the basis of said frequency differences of arrival $FDOA_{ij}$ of the message of interest estimated for the three pairs of base stations. Obviously, it is also possible to consider a number of base stations and of pairs of base stations greater than three.

The above description clearly illustrates that via its various features and their advantages, the present invention reaches the goals set it. In particular, via the use of the calibration messages emitted by calibration terminals, the differential measurement error introduced for a pair of base stations can be compensated for without having to frequency synchronise said base stations to each other.

The invention claimed is:

1. A method for estimating a movement of a terminal of interest with respect to an access network of a wireless communication system, the terminal of interest located in a geographical area served by a pair of base stations of the access network, the method comprising steps of:

measuring, for each base station, a frequency of arrival of a message of interest transmitted by the terminal of interest;

measuring, for said each base station, frequencies of arrival of calibration messages transmitted by calibration terminals, the calibration terminals being distinct from the terminal of interest;

estimating a differential measurement error for the pair of base stations based on the frequencies of arrival of the calibration messages;

estimating a frequency difference of arrival of the message of interest based on the frequencies of arrival of the message of interest and on the differential measurement error;

estimating the movement of the terminal of interest based on the frequency difference of arrival of the message of interest for the pair of base stations;

wherein movements of all or a subset of the calibration terminals are not known; and wherein the estimation of the differential measurement error comprises calculating, for each calibration message, a frequency difference of arrival of said each calibration message for the pair of base stations based on the measured frequencies of arrival of said each calibration message, the differential measurement error being estimated by calculating an average value of the frequency differences of arrival of the calibration messages.

2. The method according to claim 1, further comprising a step of selecting messages received during a time window of a predetermined length comprising a reception of the message of interest as the calibration messages.

3. The method according to claim 1, wherein the subset of the calibration terminals are reference terminals, each reference terminal having a predetermined movement.

4. The method according to claim 1, wherein the terminal of interest are located in a geographical area served by at least three base stations forming three pairs of base stations, the method further comprising steps of: estimating the frequency difference of arrival of the message of interest for each of the three pairs of base stations; and estimating the movement of the terminal of interest based on the frequency differences of arrival of the message of interest estimated for the three pairs of base stations.

5. An access network to estimate a movement of a terminal of interest, comprising:

a pair of base stations, the terminal of interest being located in a geographical area served by the pair of base stations, each base station comprising a processor configured to measure a frequency of arrival of a message of interest transmitted by the terminal of interest and frequencies of arrival of calibration messages transmitted by calibration terminals, the calibration terminals being distinct from the terminal of interest;

a processing server, comprising a processor, configured to:

calculate a frequency difference of arrival of each calibration message for the pair of base stations based on the measured frequencies of arrival of said each calibration message;

estimate a differential measurement error for the pair of base stations by calculating an average value of the frequency differences of arrival of the calibration messages;

estimate a frequency difference of arrival of the message of interest based on the measured frequencies of arrival of the message of interest and on the differential measurement error; and estimate the movement of the terminal of interest based on the frequency difference of arrival of the message of interest for the pair of base stations; and wherein movements of all or a subset of the calibration terminals are not known.

6. The access network according to claim 5, wherein messages received during a time window of a predetermined length comprising a reception of the message of interest are selected as the calibration messages.

7. A wireless communication system comprising the terminal of interest, the calibration terminals and the access network according to claim 5.

8. A system according to claim 7, wherein the subset of the calibration terminals are reference terminals, each reference terminal having a predetermined movement.

* * * * *